May 28, 1940.                C. H. CUNO                2,202,191
                           FILTERING LIQUID
                      Filed May 21, 1937          2 Sheets-Sheet 1
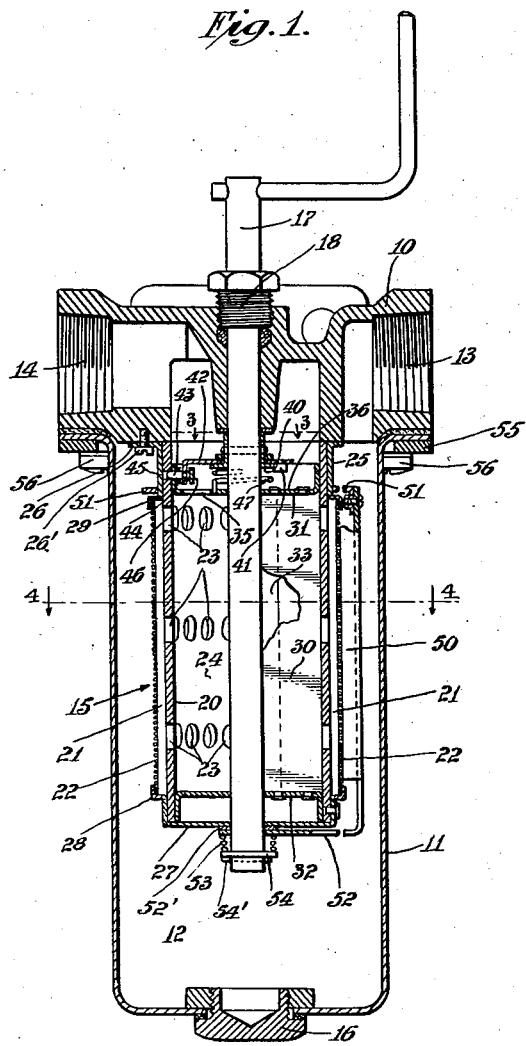
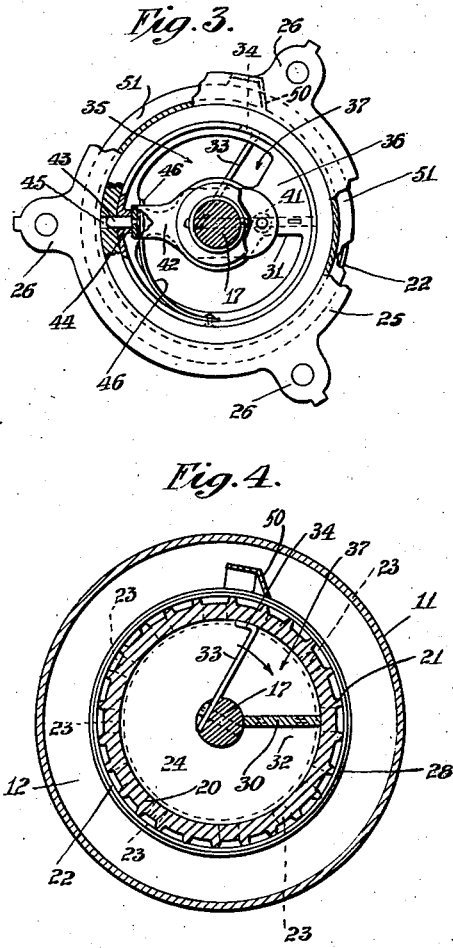
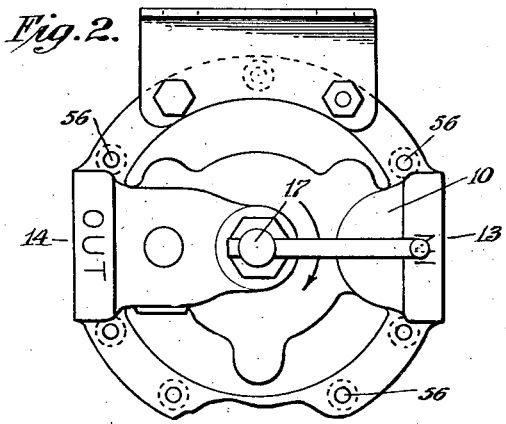
INVENTOR
Charles H. Cuno
BY
ATTORNEY May 28, 1940.  C. H. CUNO  2,202,191
FILTERING LIQUID
Filed May 21, 1937  2 Sheets-Sheet 2
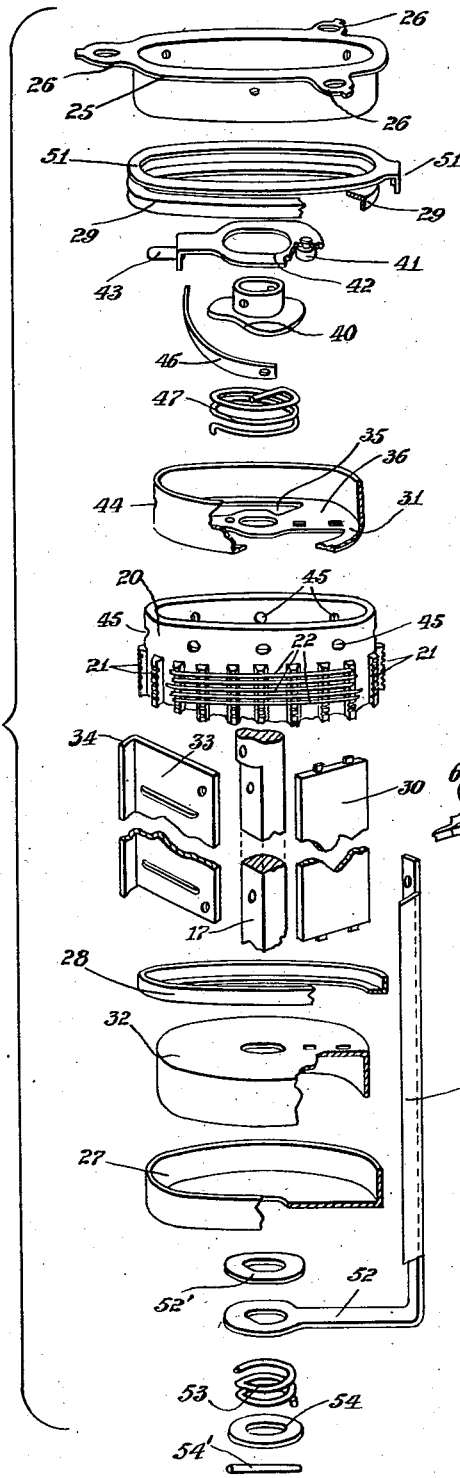
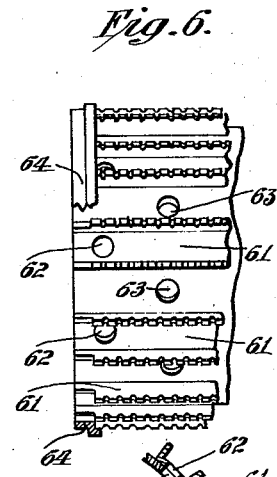
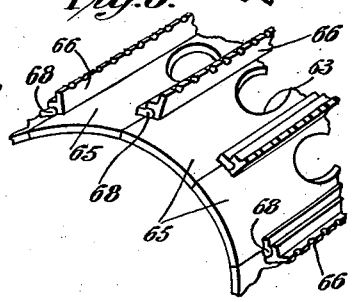
INVENTOR
Charles H. Cuno
BY
ATTORNEY Patented May 28, 1940

2,202,191

UNITED STATES PATENT OFFICE 2,202,191

FILTERING LIQUID

Charles H. Cuno, Meriden, Conn., assignor to The Cuno Engineering Corporation, Meriden, Conn., a corporation of Connecticut Application May 21, 1937, Serial No. 143,921

7 Claims. (Cl. 210—167)

My invention relates to mechanical filters for removing solids from liquids. The main object is to provide a simple but reliable device which can be readily cleaned by reverse flow of the liquid which has been filtered. One object is to provide a construction in which the screen or filter unit can be cleaned by the action of a continuously rotating shaft. One object is to provide a stationary screening or filtering unit with an intermittently operated simple pump for causing a reverse flow of the liquid. Another object is to provide such a device with means for scraping off and collecting the residue in such a manner that it does not interfere with the filtering action.

To accomplish this I mount a screening unit within a housing through which liquid flows and provide a pump consisting of two vanes or plates inside the screening unit. One of these plates has an intermittent action in the nature of a traveling abutment and the other follower plate is either continuously or intermittently moved toward the momentarily stationary abutment plate so as to intermittently force the liquid which is in the space between the plates in reverse flow outwardly through a small section of the screen. A scraper is arranged outside the screening unit so as to remove the residue and cause it to fall downward into a sump in the housing.

Preferably the follower plate is actuated by a shaft which has a continuous rotating movement and the screening unit is either stationary or may rotate with the shaft. In the simplest form the screening unit is stationary and the scraper moves with the follower plate.

Preferably the device is so constructed that the filtering screen, pump and scraper may be readily inspected and removed or replaced without disturbing the pipe line connections.

Fig. 1 is a vertical sectional view of one form of filter embodying my invention.

Fig. 2 is a plan view of the same.

Fig. 3 is a cross sectional view taken on a plane of the line 3—3 of Fig. 1, just beneath the head.

Fig. 4 is a sectional view on the plane of the line 4—4 of Fig. 1.

Fig. 5 is an exploded perspective view of parts of the filter.

Fig. 6 is a detail side view of one end of a modified form of screen body.

Fig. 7 is a fragmentary sectional view of the form of Fig. 6.

Fig. 8 is a perspective view of a fragment of another modified form of screen body.

Fig. 9 is a sectional view of a part of the screen body of Fig. 8.

The casing has a head 10 and a cup-like body 11 which provides the main chamber and sump 12 for the passage of the liquid to be filtered and for the collection of the residue or solids.

The head is provided with an inlet 13 and an outlet 14. The filtering unit 15 is mounted in the chamber 12 as will later appear. The sump may be cleaned by removing the plug 16.

The main shaft 17 is suitably supported in the head and packed by a gland 18 or other equivalent sealing means.

The preferred form of filtering unit has a cylindrical body 20 with spaced ribs 21 and a wire helix 22 wound on the ribs. The adjacent turns of the helix are spaced apart slightly to permit of passage of the liquid and to collect the solids on the outside. The cylinder has holes 23 between the ribs for the passage of the liquid into the chamber 24 inside of the filtering unit.

A ring 25 serves as an upper support to which the filtering unit is secured and it has ears 26 through which pass screws 26' for securing the ring to the underside of the head 10. The cup or plate 27 forms the bottom of the filtering unit. Rings 28 and 29 serve to protect the ends of the helix.

Inside of the screen is mounted an abutment plate 30 which is secured to the top and bottom plates 31 and 32. A follower plate 33 is secured to the shaft 17 and may have a lip or flange 34 to afford a better seal against the inner wall of the cylinder 20. The top plate 31 has passages 35 for the escape of liquid from the inside of the screen to the outlet 14. The top plate is closed at 36 so as to prevent passage of liquid from the space 37 inside the screen between the abutment plate and the follower after the follower has started to move toward the abutment plate and during the time that the pump action forces liquid reversely through the screen to remove the collected solids from between the wires. The space between the plates 30 and 33 at any one time constitutes the pumping chamber.

A cam 40 is secured on the shaft 17 and coacts with a projection or roller 41 carried by the slide 42 which is guided on the shaft and has a pin or tooth 43 which slides in a perforation 44 in the rim of the plate 31. This pin 43 extends through the rim into one of a series of recesses 45 in the upper edge of the cylinder 20. A spring 46 presses the slide with its pin outwardly and the cam on the shaft serves to retract the slide and pin. A spring 47 has one end secured to the shaft 17 and the other end secured to the top plate 31.

Liquid passes continuously through all parts of the stationary screen 20 while the shaft 17 is stationary. When the shaft is rotated clockwise far enough for follower plate 33 to close the end of the slot 35 the liquid in the space 37 is trapped and gradually forced outwardly through the screen to loosen the solids from the passages in the screen. As the follower reaches or approaches close to the abutment plate and has completed the reverse pumping action, the cam 40 retracts the slide and pin and releases the top plate 31 and the attached abutment plate and bottom plate 32, and the spring 47 which has been placed under tension by rotation of the shaft 17 causes the two plates and the abutment to rotate clockwise away from the follower plate until the pin 43 snaps into the next hole 45 in the cylinder 20. The shaft 17 may be turned intermittently or continuously but in any event small sections of the screen will be successively cleaned by intermittent pump action.

Within the main chamber of the filter is mounted a scraper 50 which has its upper end secured to the anchor ring 51 and a lower arm 52 secured to the shaft 17 so as to rotate the scraper with the shaft. This scraper blade is located in such a position that it scrapes off the solids just after they have been loosened by the pump action above described. Washer 52' seals or packs the shaft hole in member 27.

A spring 53 is interposed between the washer 54 and pin 54' and the arm 52 so as to keep the parts snugly in position.

It will be seen that the construction is very simple and not likely to get out of order.

For convenience in construction, inspection and repair the lower part 11 of the casing is detachably connected to the head 10 by a ring 55 and screws 56. The sump may be cleaned by removing the plug 16. The filtering unit may be inspected by removing the cup 11. The screen may be removed by taking out the pin 54', screws 26' and sliding the cylinder and scraper from the shaft after retracting the latch pin 43.

In Figs. 6 and 7 I have shown a modified form of screen body member consisting of a cylinder or tube 60 with channel-like members 61 secured to it and forming the support for the helix of wire or other form of screen. Passages 52 and 63 may be formed either through the tube 60 or through both the channel and the tube. A ring 64 may be placed over the ends of the members 61 to hold or assist in holding them in place and also to anchor the end of the wire coil.

The form shown in Figs. 8 and 9 is intended to be built up or assembled from a number of sections 65, each of which has a rib 66 for supporting the screen member of wire, etc., a groove 67 and a rib or tongue 68. These tongues and grooves are adapted to interfit or interlock so that the cylinder can be made up out of a number of sections and held together by a ring (such as 64 of Fig. 6) or otherwise, tubes of different sizes may be built up by using the desired number of sections although they need not form a true cylinder. It is possible to form very large and strong bodies in this way out of relatively small and easily handled parts.

I claim:

1. A filter comprising a casing with a head and a main chamber having an inlet and an outlet, a stationary filtering unit mounted in the chamber and through which the liquid passes to the outlet, a pumping unit mounted within the filtering unit and comprising upper and lower heads and a central shaft, an abutment member connecting the heads and extending from the shaft to the inner wall of the filtering unit, a follower plate carried by the shaft and extending to the inner wall of the filtering unit, latching means at times holding stationary the abutment member of the pumping unit, a spring connecting the shaft with said abutment member of the pumping unit, and a cam connected to the shaft for releasing the latching means as the shaft is turned so that the spring will rotate the abutment member.

2. A filter comprising a casing, a shaft rotatable in the casing, a stationary screen member surrounding the shaft, a pump within the screen for forcing liquid outwardly through the screen and comprising two vanes movable between the shaft and the screen member, a latch member connected to one of the vanes and coacting with the screen member to lock said vane against movement, a cam on the shaft coacting with the latch member to release said latch member, means of connection between the shaft and the other vane, a scraper on the outside of the screen member, a driving connection between the shaft and said scraper and means rendered operative by the release of the latch member for moving one vane with respect to the other vane when the latch member is released.

3. A filter comprising a casing having a main chamber with an inlet and an outlet and a collecting sump at the bottom, a filtering unit mounted in the chamber and through which the liquid passes to the outlet, a pumping unit mounted within the filtering unit and comprising end plates and a rotatable shaft, an abutment plate connecting the end plates, a follower plate carried by the shaft, latching means at times holding stationary the abutment plate of the pumping unit, a spring connecting the shaft with said abutment plate, a cam driven by the shaft for releasing the latching means as the shaft is turned so that the spring will rotate the abutment plate, and a scraper on the outside of the filtering unit adjacent the follower plate.

4. A filter comprising a casing with a main chamber having an inlet and an outlet, a filtering unit mounted in the chamber and through which the liquid passes to the outlet, a pumping unit mounted within the filtering unit and comprising spaced end plates and a rotatable shaft, an abutment plate connecting the end plates, a follower plate carried by the shaft, latch mechanism coacting with one end plate and at times holding stationary the abutment plate, a spring connecting the shaft with one end plate, and a cam driven by the shaft for releasing the latch mechanism as the shaft is turned so that the spring will rotate the abutment plate.

5. A filtering screen formed of a number of segments each having a rib projecting outwardly therefrom and each segment having a part on one edge interfitting with a groove in the adjacent edge of another segment and a wire helix wound on the ribs of the various segments.

6. A filter having an inlet and an outlet and comprising a casing with a closure and a filtering unit carried within the casing and through which liquid may pass, pumping means within the filtering unit and comprising a rotatable shaft, spaced apart heads placed transversely of said shaft and a vane associated with said heads and extending from the shaft to the inner wall of the filter unit, a second vane carried by the shaft and extending substantially to the inner wall of said unit and to the opposed faces of the heads, latching means carried at least in part by the pumping means and engageable with a stationary part of the filter to alternately lock and release said means, a spring stressable by relative movement of the shaft and the pumping means and a cam connected to said shaft for releasing said latching means as the shaft is turned so that the spring is alternately stressed and released thereby rotating the pumping means.

7. A filter comprising a casing with a main chamber having an inlet and an outlet, a stationary filtering unit secured to the casing and mounted in the chamber and through which the liquid passes to the outlet, a pumping unit mounted within the filtering unit and comprising upper and lower heads and a rotatable shaft, an abutment plate connecting the heads, a follower plate carried by the shaft, latching means coacting with the upper head and at times holding stationary the abutment part of the pumping unit, means connecting the shaft with said upper head of the pumping unit, and means driven by the shaft for releasing the latching means as the shaft is turned so that the connecting means will rotate the abutment part.

CHARLES H. CUNO.